US010362052B2

(12) United States Patent
Li et al.

(10) Patent No.: US 10,362,052 B2
(45) Date of Patent: *Jul. 23, 2019

(54) GENERATING A VIRTUAL DATABASE TO TEST DATA SECURITY OF A REAL DATABASE

(71) Applicant: International Business Machines Corporation, Armonk, NY (US)

(72) Inventors: Shuo Li, Beijing (CN); Xin Peng Liu, Beijing (CN); Sheng Yan Sun, Beijing (CN); Hua Wang, Littleton, MA (US); Jun Wang, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/814,560

(22) Filed: Nov. 16, 2017

(65) Prior Publication Data

US 2018/0234450 A1    Aug. 16, 2018

Related U.S. Application Data

(63) Continuation of application No. 15/433,067, filed on Feb. 15, 2017, now Pat. No. 10,171,487.

(51) Int. Cl.
*G06F 21/57* (2013.01)
*H04L 29/06* (2006.01)
(Continued)

(52) U.S. Cl.
CPC ...... *H04L 63/1433* (2013.01); *G06F 9/45533* (2013.01); *G06F 16/256* (2019.01);
(Continued)

(58) Field of Classification Search
CPC ........................... H04L 63/1433; H04L 63/20
(Continued)

(56) References Cited

U.S. PATENT DOCUMENTS 6,563,743 B2   5/2003  Hanzawa et al.
7,697,355 B2   4/2010  Kobayashi
(Continued)

FOREIGN PATENT DOCUMENTS

CN    102722667 A    10/2012
CN    103699479 A    4/2014
(Continued)

OTHER PUBLICATIONS

"A High Performance Architecture for Virtual Databases", Delphix Media, Apr. 3, 2013, 10 pages. https://www.delphix.com/blog/data-virtualization/high-performance-architecture-virtual-databases.
(Continued)

*Primary Examiner* — Haresh N Patel
(74) *Attorney, Agent, or Firm* — Yee & Associates, P.C.; Jeffrey LaBaw

(57) ABSTRACT

Determining a data security risk level of a virtual database is provided. An object catalog corresponding to a real database is imported into the virtual database. Objects in the object catalog are organized by levels. It is determined whether one or more data security policy definitions corresponding to a set of objects referenced by test query message traffic performed an action in response to determining that one or more test query messages in the test query message traffic run on the virtual database did not satisfy respective parameters of the one or more data security policy definitions. In response to determining that one or more of the data security policy definitions corresponding to the set of objects referenced by the test query message traffic did not perform the action, a test failure result is returned. A data security risk level for the virtual database is determined based on the result.

7 Claims, 6 Drawing Sheets

(51) Int. Cl.
*G06F 21/55* (2013.01)
*G06F 21/62* (2013.01)
*G06F 16/9032* (2019.01)
*G06F 16/951* (2019.01)
*G06F 9/455* (2018.01)
*G06F 16/25* (2019.01)

(52) U.S. Cl.
CPC ...... *G06F 16/90332* (2019.01); *G06F 16/951* (2019.01); *G06F 21/552* (2013.01); *G06F 21/6227* (2013.01); *H04L 63/20* (2013.01)

(58) Field of Classification Search
USPC .......................................................... 726/25
See application file for complete search history.

(56) References Cited

U.S. PATENT DOCUMENTS

| | | | |
|---|---|---|---|
| 8,572,723 B2 | 10/2013 | Barsness et al. | |
| 8,788,304 B2 | 7/2014 | Lee et al. | |
| 8,904,239 B2 | 12/2014 | Seren et al. | |
| 9,037,543 B2 | 5/2015 | Zha et al. | |
| 9,037,612 B2 | 5/2015 | Zha et al. | |
| 2007/0157286 A1* | 7/2007 | Singh | H04L 41/0866 726/1 |
| 2007/0162953 A1 | 7/2007 | Bolliger et al. | |
| 2008/0010233 A1* | 1/2008 | Sack | G06F 21/6227 726/1 |
| 2009/0193173 A1 | 7/2009 | Joshi et al. | |
| 2013/0191105 A1 | 7/2013 | Abdirashid et al. | |
| 2014/0164776 A1* | 6/2014 | Hook | H04L 9/14 713/171 |
| 2014/0282521 A1* | 9/2014 | Lango | G06F 9/45558 718/1 |
| 2015/0317449 A1* | 11/2015 | Eder | G06Q 50/22 600/595 |
| 2016/0104934 A1 | 4/2016 | Jang et al. | |
| 2016/0182527 A1* | 6/2016 | Lietz | H04L 63/105 726/6 |
| 2017/0237778 A1* | 8/2017 | DiGiambattista | H04L 63/20 726/1 |
| 2018/0234450 A1* | 8/2018 | Li | H04L 63/1433 726/1 |

FOREIGN PATENT DOCUMENTS

| | | |
|---|---|---|
| EP | 2474933 A1 | 7/2012 |
| WO | WO2005101237 A1 | 10/2005 |

OTHER PUBLICATIONS

Li et al. "Generating a Virtual Database to Test Data Security of a Real Database", filed Feb. 15, 2017, U.S. Appl. No. 15/433,067, 39 pages.

List of IBM Patents Treated as Related, dated Nov. 15, 2017, 2 pages.

Notice of Allowance, dated Sep. 12, 2018, regarding U.S. Appl. No. 15/433,067, 17 pages.

* cited by examiner

US 10,362,052 B2

GENERATING A VIRTUAL DATABASE TO TEST DATA SECURITY OF A REAL DATABASE

BACKGROUND

1. Field

The disclosure relates generally to database systems and more specifically to generating a virtual database object catalog utilizing a corresponding real database object catalog, associating each of the objects within the virtual database object catalog with corresponding predefined data security policies for assessing a level of risk to virtual database objects that are referenced by incoming virtual database test query message traffic, and generating a data security violation report for the virtual database.

2. Description of the Related Art

A database refers to a set of related data that is organized into a data collection. Typically, a database includes schemas, tables, queries, reports, views, and other objects. Databases are used to support internal operations of organizations and to underpin online interactions with customers, for example. Databases also are used to hold administrative information and more specialized data, such as engineering data or economic models.

Access to the collection of data stored in a database is usually provided by a database management system (DBMS) consisting of computer software that allows users to interact with the database and provides access to the data contained in the database. However, restrictions may exist that limit access to particular data. Generally, a database management system is designed to allow the definition, creation, querying, updating, and administration of a database. Because of the relationship between the database and the database management system, the term database often refers to both the database and its corresponding database management system. Both the database and its corresponding database management system conform to the principles of a particular database model. A database system collectively refers to the database model, the database management system, and the database. A physical database server is a dedicated computer that stores the database and runs the corresponding database management system.

Chief Experience Officers recognize database security as a critical risk factor for practically every area of business. Because database systems may store valuable data, database-related security systems need to assure data integrity. Typically, service providers and customers apply different data security attacks to test their database systems for data integrity assurance. However, this type of data security attack testing may cause damage to an online service, which is provided by the database system under test. For example, a SQL injection attack may not be applied to a real production database system providing an online service. In addition, it may be difficult for a customer to set up an equivalent production database system for data security testing purposes.

SUMMARY

According to one illustrative embodiment, a computer-implemented method for determining a data security risk level of a virtual database is provided. A computer imports an object catalog corresponding to a real database into the virtual database. The computer organizes objects in the object catalog by levels within the virtual database. The computer determines whether one or more data security policy definitions corresponding to a set of objects referenced by test query message traffic performed an action in response to the computer determining that one or more test query messages in the test query message traffic run on the virtual database did not satisfy respective parameters of the one or more data security policy definitions. In response to the computer determining that one or more of the data security policy definitions corresponding to the set of objects referenced by the test query message traffic did not perform the action in response to determining that one or more test query messages in the traffic run on the virtual database did not satisfy respective parameters of the one or more data security policy definitions, the computer returns a data security test failure result. The computer determines a data security risk level for the virtual database based on the returned data security test result.

DETAILED DESCRIPTION

Figure 1:
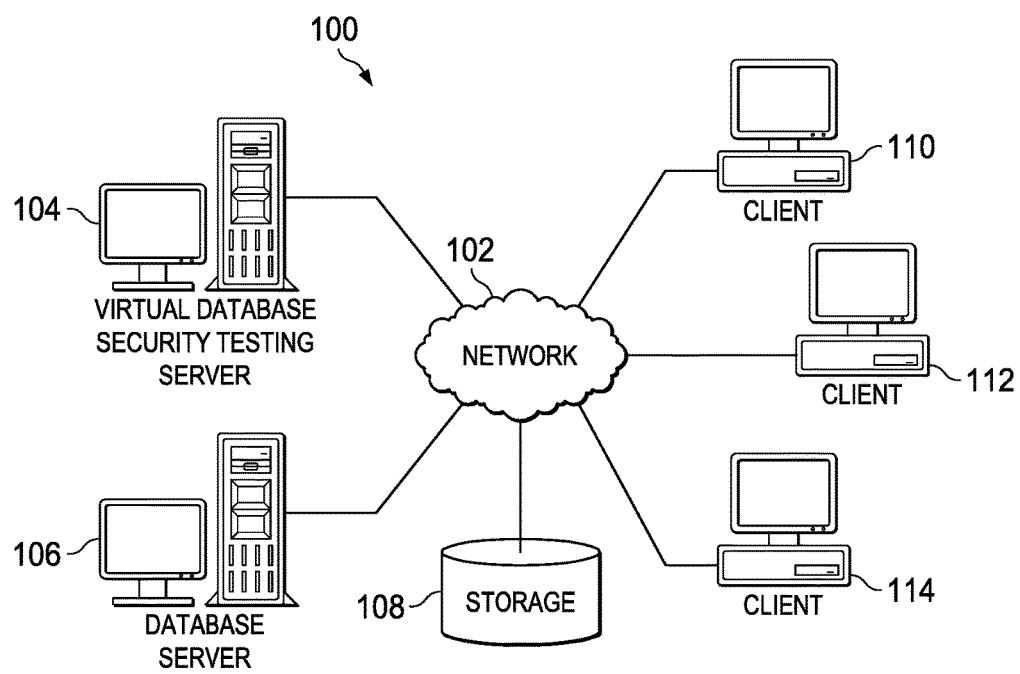
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In this example, server 104 is a virtual database security testing server and server 106 is a database server. Also, it should be noted that virtual database security testing server 104 and database server 106 may each represent a plurality of different servers.

Database server 106 includes a real production database system that is up and running. Furthermore, virtual database security testing server 104 may provide data security testing services to database server 106. For example, virtual database security testing server 104 may generate a virtual database, which corresponds to the real production database running on database server 106, using a database catalog of database server 106; associate each of the objects within the database catalog with corresponding predefined data security policies for assessing a level of risk to objects that are referenced by incoming virtual database test query messages; and generate a data security report for the virtual database. Thus, virtual database security testing server 104 may perform data security checking on incoming database query messages without affecting or disturbing the real production database on database server 106.

Client 110, client 112, and client 114 also connect to network 102. Clients 110, 112, and 114 are clients of database server 106. In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, cellular phones, smart televisions, smart watches, gaming devices, kiosks, and the like, with wire or wireless communication links to network 102. Clients 110, 112, and 114 may send query messages to database server 106.

Storage 108 is a network storage device capable of storing any type of data in a structured format or an unstructured format. In addition, storage 108 may represent a set of one or more network storage devices. Storage 108 may store, for example, identifiers for a plurality of different database servers; internet protocol address for the plurality of different database servers; database structure definitions, which include object catalogs, for the plurality of different database servers; predefined data security policies; test query messages; virtual database test result reports; and the like. Further, storage 108 may store other data, such as authentication or credential data that may include user names, passwords, and biometric data associated with the users and database system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on database server 106 and downloaded to virtual database security testing server 104 over network 102 for use on virtual database security testing server 104.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

Figure 2:
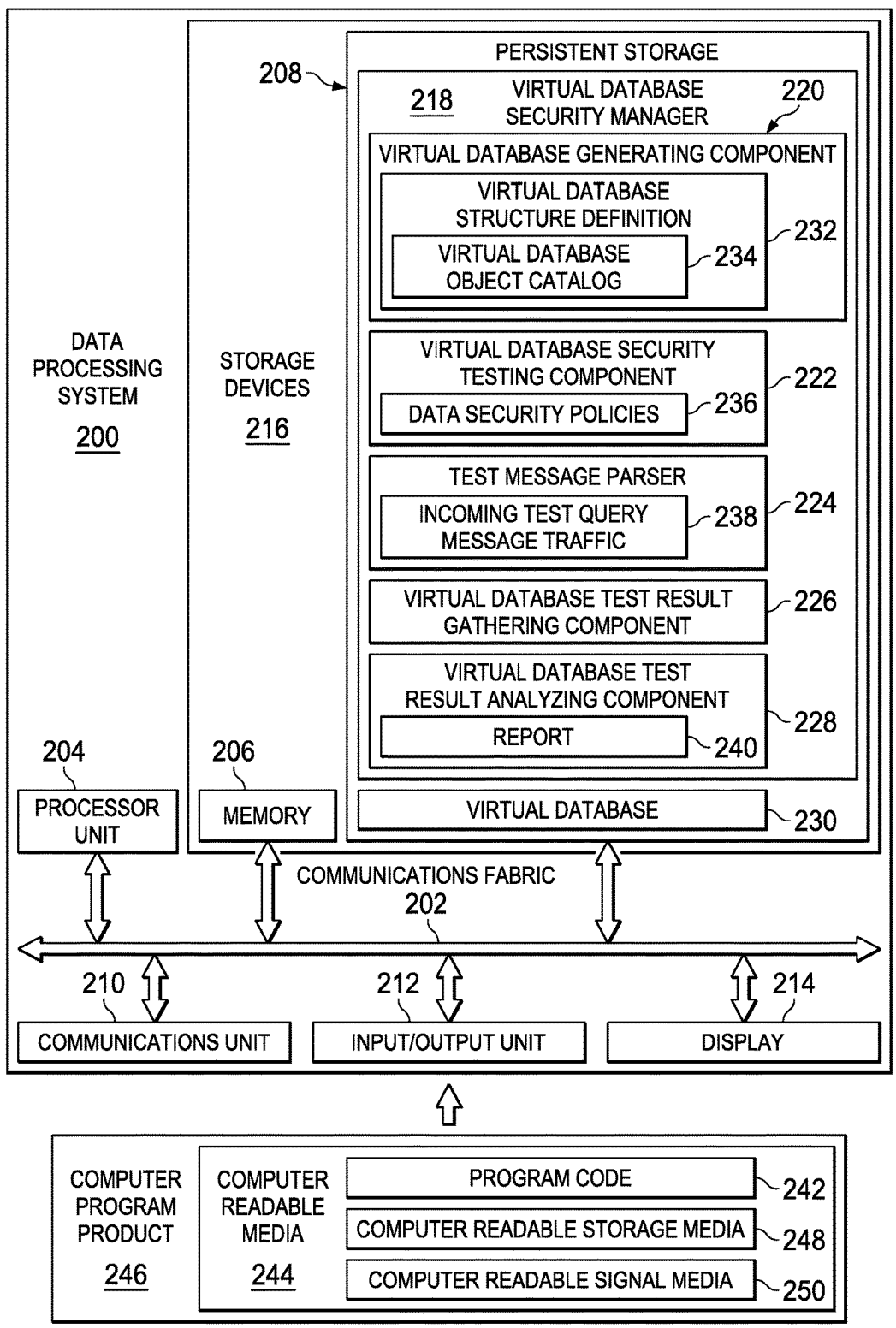
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores virtual database security manager 218. Virtual database security manager 218 generates a virtual database corresponding to a real production database using a database catalog of the real production database, associates each of the objects within the database catalog with corresponding predefined data security policies for assessing risk to objects within the database catalog referenced by virtual database test query messages, and generates a data security report for the virtual database. It should be noted that even though virtual database security manager 218 is illustrated as residing in persistent storage 208, in an alternative illustrative embodiment virtual database security manager 218 may be a separate component of data processing system 200. For example, virtual database security manager 218 may be a hardware component coupled to communication fabric 202 or a combination of hardware and software components. In another alternative illustrative embodiment, a first set of components of virtual database security manager 218 may be located in data processing system 200 and a second set of one or more components of virtual database security manager 218 may be located in a database server, such as database server 106 in FIG. 1. In yet another alternative illustrative embodiment, components of virtual database security manager 218 may be located in the database server instead of, or in addition to, data processing system 200.

In this example, virtual database security manager 218 includes virtual database generating component 220, virtual database security testing component 222, test message parser 224, virtual database test result gathering component 226, and virtual database test result analyzing component 228. However, it should be noted that virtual database security manager 218 may include more or fewer components than shown. For example, different illustrative embodiments may combine two or more components into one component, divide one component into two or more components, or add other components not shown.

Virtual database security manager 218 utilizes virtual database generating component 220 to generate virtual database 230. Virtual database 230 is a virtual representation of a real production database on the database server. Virtual database generating component 220 generates virtual database 230 using virtual database structure definition 232, which includes virtual database object catalog 234. Virtual database structure definition 232 and virtual database object catalog 234 match a virtual database structure definition and virtual database object catalog of the real production database. In other words, virtual database structure definition 232 represents a copy of the structural definition of the real production database and virtual database object catalog 234 represents a copy of the catalog of objects within the real production database.

Virtual database security manager 218 utilizes virtual database security testing component 222 to test the security of data contained in virtual database 230. Virtual database security testing component 222 tests the data security of virtual database 230 using data security policies 236. Data security policies 236 are rules that a database system administrator defines for assessing a level of risk to data in virtual database 230. Virtual database security manager 218 maps each data security policy in data security policies 236 to corresponding objects within virtual database object catalog 234. Each data security policy may include, for example, a set of one or more parameters or conditions, which are to be satisfied by incoming test query messages referencing an object corresponding to a given data security policy, and a set of one or more action steps, which virtual database security testing component 222 is to take when the set of parameters are not satisfied by the incoming test query messages. An action step may, for example, block a high data risk level activity requested by an incoming test query message, issue an alert for a medium data risk level activity requested by an incoming test query message, log a low data risk level activity requested by an incoming test query message, and the like.

Virtual database security manager 218 utilizes test message parser 224 to parse incoming test query message traffic 238 to determine a context and type of each incoming test query message. Incoming test query message traffic 238 may include, for example, test query messages designed by a database system administrator to test the data security of virtual database 230 and/or actual query messages received from the real production database corresponding to virtual database 230 for data security testing. Each test query message references a set of objects within virtual database object catalog 234. Virtual database security manager 218 identifies one or more data security policies that correspond to the set of objects referenced by a particular test query message. Then, virtual database security manager 218 applies the one or more identified data security policies to that particular test query message to determine whether the one or more data security policies corresponding to the set of objects referenced by that particular query message perform correctly.

For example, a particular data security policy may set a threshold of only X number of rows of virtual database 230 may be output per day. However, incoming test query message traffic 238 may request X+1 rows in one day. If that particular data security policy performs an action step, such as issuing an alert to a database system administrator, in response to incoming test query message traffic 238 requesting X+1 rows in one day, then virtual database security manager 218 determines that that particular data security policy is performing correctly. The data security policy performing the action step of issuing an alert in this example is a data security test pass. Conversely, if that particular data security policy does not perform the action step of issuing an alert in response to incoming test query message traffic 238 requesting X+1 rows in one day, then virtual database security manager 218 determines that that particular data security policy is not performing correctly. The data security policy not performing the action step of issuing an alert in this example is a data security test failure.

Virtual database security manager 218 utilizes virtual database test result gathering component 226 to collect the data security test results of each policy in data security policies 236 applied to incoming test query message traffic 238. The data security test results include identification of the type of each message in incoming test query message traffic 238 referencing objects within virtual database object catalog 234. Virtual database security manager 218 utilizes virtual database test result analyzing component 228 to analyze the data security test results collected by virtual database test result gathering component 226 and to generate report 240. Virtual database test result analyzing component 228 may utilize, for example, natural language processing to analyze the data security test results and machine learning to generate report 240.

Communications unit 210, in this example, provides for communication with other computers, data processing systems, and server devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information, such as report 240, to a user. Display 214 also may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments receive a database structure definition (e.g., database object catalog) of a real production database system and test configuration. The test configuration may include, for example, a virtual database component, a data security component, an attack simulation test component, and a virtual database test result component. Illustrative embodiments analyze the virtual database test result to determine whether the data security component can protect the virtual database system during an attack. In other words, illustrative embodiments determine whether predefined data security policies of the data security component can provide a threshold level of data integrity protection for the virtual database.

Thus, illustrative embodiments generate virtual databases independent of the real production databases. In addition, illustrative embodiments do not require a layer between clients and the real production databases. Illustrative embodiments leverage a real production database's object catalog to generate a virtual database object catalog and associate the objects within the virtual database catalog with predefined data security policies that cover a plurality of different types of data security scenarios, such as, but not limited to, buffer overflow and standard query language (SQL) injection. Illustrative embodiments parse incoming test query messages to determine the context and type of each message. Illustrative embodiments check the values of database objects within an incoming SQL statement and determine whether any data security policy is violated by the incoming SQL statement.

As a result, illustrative embodiments ensure that the data security component, which uses the predefined data security policies, can keep the virtual database under test secure. A predefined data security policy may, for example, limit the number of session connections per second from a specified internet protocol address range to 10,000 session connections. If the number of session connections per second from the specified internet protocol address range exceeds 10,000, then the predefined data security policy should issue an alert to a database system administrator, for example. If the predefined data security policy issues the alert, then the virtual database test result component determines that the data security policy is working as expected and returns a data security test pass. If the predefined data security policy does not issue the alert, then the virtual database test result component determines that the data security policy is not working as expected and returns a data security test failure.

Figure 3:
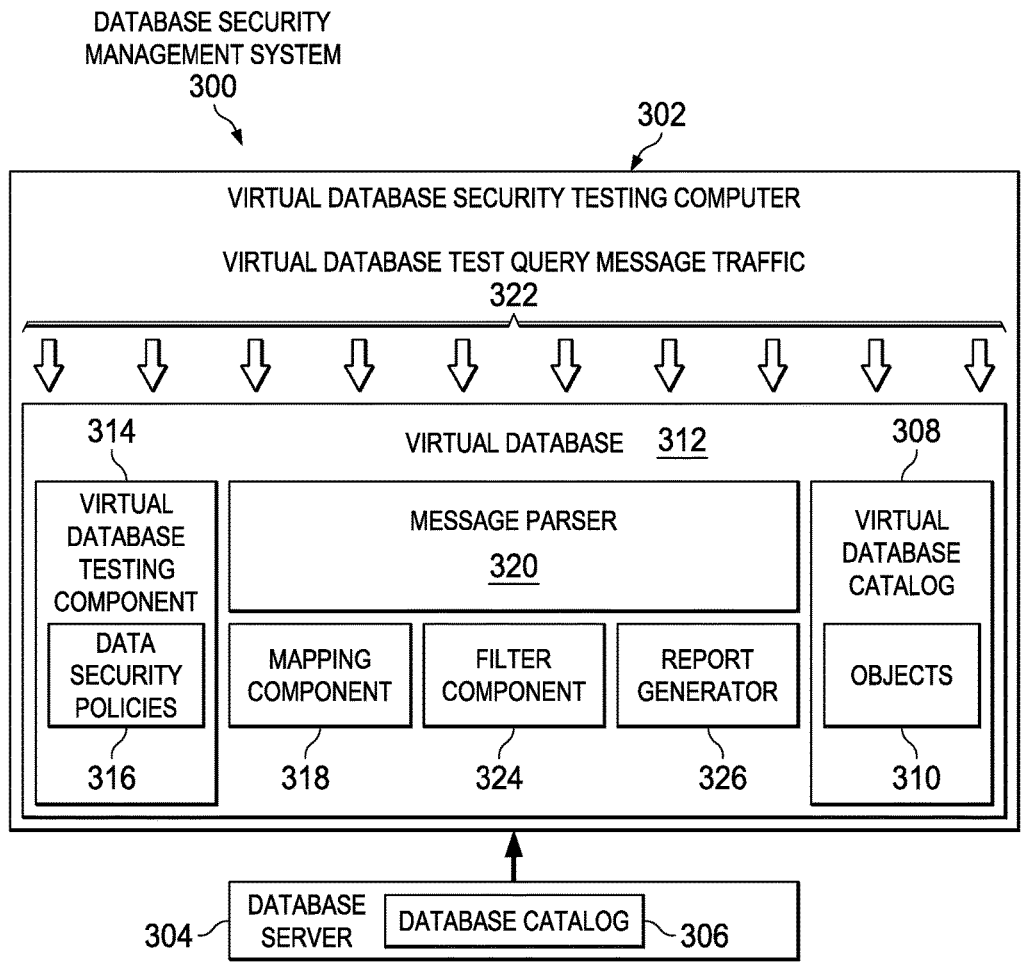
FIG. 3 is a diagram illustrating an example of a database security management system in accordance with an illustrative embodiment.

With reference now to FIG. 3, a diagram illustrating an example of a database security management system is depicted in accordance with an illustrative embodiment. Database security management system 300 is a system of software and hardware components for testing data security of real production databases without utilizing the real production databases during testing. Database security management system 300 may be implemented in a network of data processing systems, such as network data processing system 100 in FIG. 1.

In this example, database security management system 300 includes virtual database security testing computer 302 and database server 304. However, it should be noted that database security management system 300 is only meant as an example and not as a limitation on illustrative embodiments. In other words, database security management system 300 may include any number of testing computers, database servers, and other devices not shown.

Virtual database security testing computer 302 may be, for example, virtual database security testing server 104 in FIG. 1 or data processing system 200 in FIG. 2. Database server 304 be, for example, database server 106 in FIG. 1. Database server 304 includes database catalog 306. Database catalog 306 defines the organization of objects within the real production database corresponding to database server 304.

Virtual database security testing computer 302 imports or retrieves database catalog 306 from database server 304 to generate virtual database catalog 308. Virtual database catalog 308 is substantially the same as database catalog 306. Virtual database catalog 308 includes objects 310. Virtual database security testing computer 302 organizes objects 310 by object levels, such as virtual database catalog object levels 400 in FIG. 4.

Virtual database security testing computer 302 utilizes virtual database catalog 308 to generate virtual database 312. Virtual database 312 may be, for example, virtual database 230 in FIG. 2. Virtual database 312 is a virtual representation of the real production database corresponding to database server 304.

Virtual database security testing computer 302 utilizes virtual database testing component 314 to test the data security of virtual database 312. Virtual database testing component 314 may be, for example, virtual database security testing component 222 in FIG. 2. Virtual database testing component 314 includes data security policies 316, such as data security policies 236 in FIG. 2.

Virtual database security testing computer 302 utilizes mapping component 318 to map each data security policy in data security policies 316 to a corresponding object in objects 310. Virtual database security testing computer 302 utilizes message parser 320 to parse virtual database test query message traffic 322 to determine a context and a type of each test query message. Message parser 320 may be, for example, test message parser 224 in FIG. 2. Virtual database test query message traffic 322 may be, for example, incoming test query message traffic 238 in FIG. 2.

Virtual database test query message traffic 322 references a set of objects in objects 310. Virtual database security testing component 314 identifies one or more data security policies in data security policies 316 that correspond to the set of objects referenced by virtual database test query message traffic 322 based on the mapping. Then, virtual database security testing component 314 applies the one or more identified data security policies to virtual database test query message traffic 322.

After applying the one or more identified data security policies to virtual database test query message traffic 322, virtual database security testing component 314 determines whether each of the one or more identified data security policies performed correctly by performing an action when parameters or conditions defined by a given data security policy were not satisfied or performed incorrectly by not performing the action when the parameters or conditions defined by the given data security policy were not satisfied. If a given data security policy performs correctly, then virtual database security testing component 314 returns a test pass for that particular data security policy. If a given data security policy performs incorrectly, then virtual database security testing component 314 returns a test failure for that particular data security policy.

Virtual database security testing computer 302 utilizes filter component 324 to filter the parsed test query messages based on definitions in virtual database catalog 308 and in data security policies 316. Virtual database security testing computer 302 also may utilize filter component 324 to collect and filter the test results of applying the one or more identified data security policies to virtual database test query message traffic 322. Filter component 324 passes the collected and filtered test results to report generator 326. Virtual database security testing computer 302 utilizes report generator 326 to analyze the test results and generate a test result report for virtual database 312. Virtual database security testing computer 302 utilizes the test result report to modify data security policies 316 to increase data security on virtual database 312 and, therefore, increase the data security on the real production database corresponding to database server 304.

Figure 4:
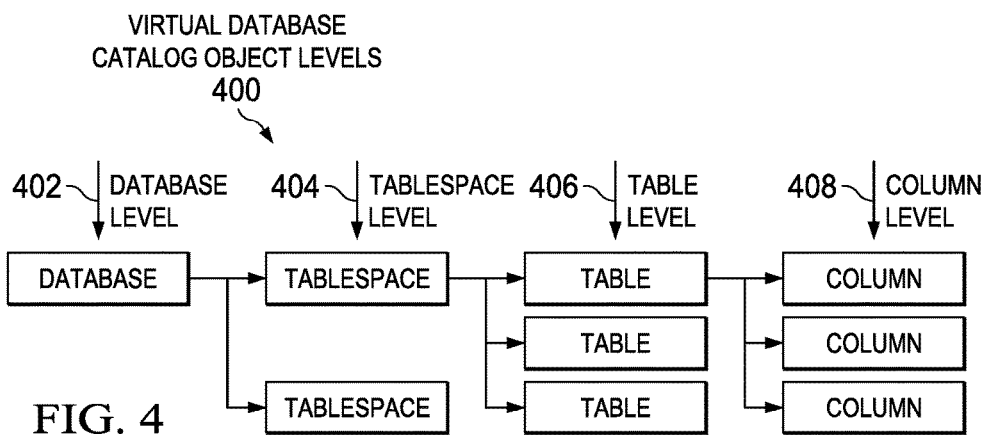
FIG. 4 is a diagram illustrating an example of virtual database catalog object levels in accordance with an illustrative embodiment.

With reference now to FIG. 4, a diagram illustrating an example of virtual database catalog object levels is depicted in accordance with an illustrative embodiment. Virtual database catalog object levels 400 may be implemented in a virtual database catalog, such as, for example, virtual database catalog 308 in FIG. 3. Illustrative embodiments organize the virtual database catalog by object levels. In this example, virtual database catalog object levels 400 include database level 402, tablespace level 404, table level 406, and column level 408. However, it should be noted that virtual database catalog object levels 400 may include more or fewer object levels than illustrated.

Figure 5:
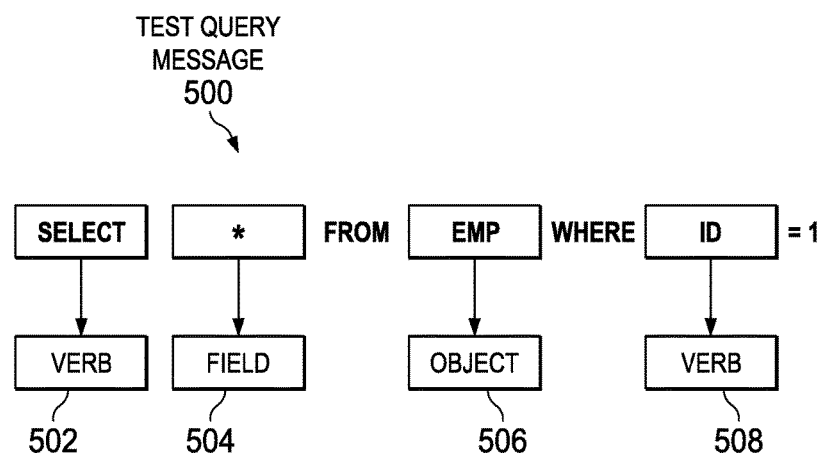
FIG. 5 is an example of a test query message in accordance with an illustrative embodiment.

With reference now to FIG. 5, an example of a test query message is depicted in accordance with an illustrative embodiment. Test query message 500 is a specific example of a virtual database test query message. Test query message 500 may be included in test query message traffic, such as, for example, virtual database test query message traffic 322 in FIG. 3. Illustrative embodiments parse test query message 500 using a message parser, such as message parser 320 in FIG. 3. In this example, parsed test query message 500 includes verb 502 "Select", field 504 "*", object 506 "EMP" (i.e., employee), and verb 508 "id=1" (i.e., employee identifier equals 1). However, it should be noted that some special test query messages may not include all the components of test query message 500.

Illustrative embodiments determine which set of objects within a virtual database catalog, such as, for example, virtual database catalog 308 in FIG. 3, are referenced by test query message 500. Illustrative embodiments then apply one or more data security policies, which correspond to the set of objects referenced by test query message 500. Afterward, illustrative embodiments analyze a result of applying the one or more data security policies corresponding to the set of objects referenced by test query message 500 to determine whether the one or more data security policies are effective for data security.

Illustrative embodiments also may utilize a procedure definition, which is defined as part of the virtual database catalog. A specific example of a procedure definition is as follows:

Create or replace procedure runbyparameters (isal in emp.sal%type, sname out varchar,sjob in out varchar)
as icount number;
begin
for 1 to 100

```
logon on user
end
select count(*) into icount from emp where sal>isal and job=sjob;
if icount=1 then
....
else
....
end if;
exception
when too_many_rows then
DBMS_OUTPUT.PUT_LINE('return too many row');
when others then
DBMS_OUTPUT.PUT_LINE('RUNBYPARMETERS ERROR!');
End;.
```

When illustrative embodiments retrieve the procedure definition, which is based on the virtual database catalog, illustrative embodiments parse the procedure definition into the different component types. In the specific example above, illustrative embodiments determine that affected objects include: procedure "runbyparameters", table "emp", and role/login "user" and affected fields include: column job/sal. When illustrative embodiments apply the procedure definition to the virtual database, illustrative embodiments check the information based on corresponding data security policies.

Figure 6:
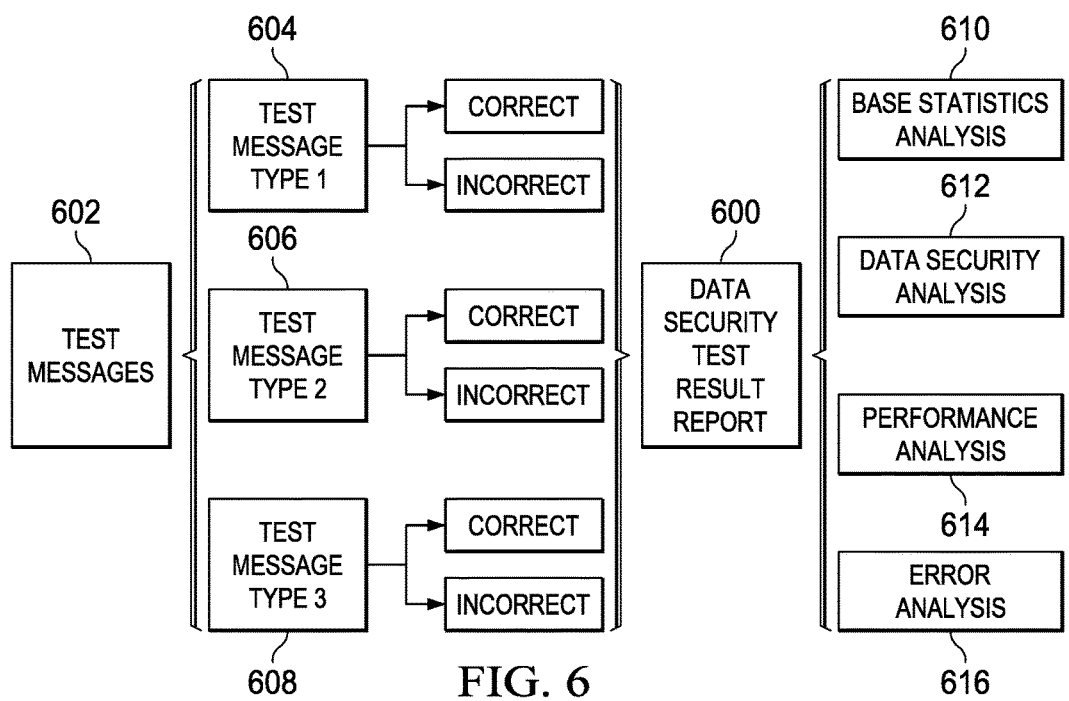
FIG. 6 is a diagram illustrating an example of a data security test result report in accordance with an illustrative embodiment.

With reference now to FIG. 6, a diagram illustrating an example of a data security test result report is depicted in accordance with an illustrative embodiment. Data security test result report 600 may be, for example, report 240 in FIG. 2. Input for data security test result report 600 includes test messages 602. Test messages 602 may be, for example, virtual database test query message traffic 322 in FIG. 3.

Illustrative embodiments parse test messages 602 to determine a type of each test message. In this example, test messages 602 include test message type 1 604, test message type 2 606, and test message type 3 608. Test message types may include, for example, database communication messages, database access and management messages, database utility messages, database authority messages, file error messages, file ownership messages, and the like.

A database communication message may be, for example, a connect message and a disconnect message. Specific database communication message examples may include: the same internet protocol address frequently logging on and logging off in a short time interval; the same internet protocol address utilizing different names while trying to logon to the same database; and the same username frequently trying to logon with the wrong password. A database system administrator may define a set of data security policies to issue an alert in response to these types of example communication messages being received by a virtual database.

A database access and management message may be, for example, a select message, an update message, an insert message, a delete message, and the like. A specific database access and management message example may be delete row A from Table A. However, the database system administrator may define a data security policy that forbids an unauthorized user to access table A. In this example, user A sent the message to delete row A from Table A. However, user A does not belong to a specified accounting group authorized to access the Table A. Consequently, user A is not an authorized user in this example. The security policy should issue an alert indicating that user A does not have authorization to perform the delete action in Table A.

A database utility message may be, for example, load, unload, reorganize, rebuild, and the like. A specific database utility message example may be to rebuild the index. However, the database system administrator may define a data security policy preventing the index from being rebuilt during specific time periods, such as high database production time periods.

A database authority message may, for example, grant or revoke user authorization. However, the database system administrator may define a data security policy that prevents granting authorization to users that are not members of a specified group of users.

A file error message may, for example, identify file errors in scan logs. A file ownership message may, for example, identify operating system level ownership of files in a data directory. The data directory contains the objects that comprise a database. A data security policy limiting access to these objects will protect the confidentiality, integrity, and availability of the database. Only operating system level users are authorized to read or write objects in the data directory.

Illustrative embodiments apply the data security policies to the corresponding types of test messages to determine whether the data security policies are performing correctly by issuing alerts when appropriate or performing incorrectly by not issuing alerts when appropriate. Data security test result report 600 includes base statistics analysis 610, data security analysis 612, performance analysis 614, and error analysis 616. Base statistics analysis 610 may include, for example, amount of test query message traffic, I/O throughput, and the like. Data security analysis 612 may include, for example, number of data security policy hits, number of database catalogs covered, and the like. Performance analysis 614 may include a general performance evaluation of the virtual database security testing component. Error analysis 616 may include any errors or faults that occurred during the test.

Figure 7A:
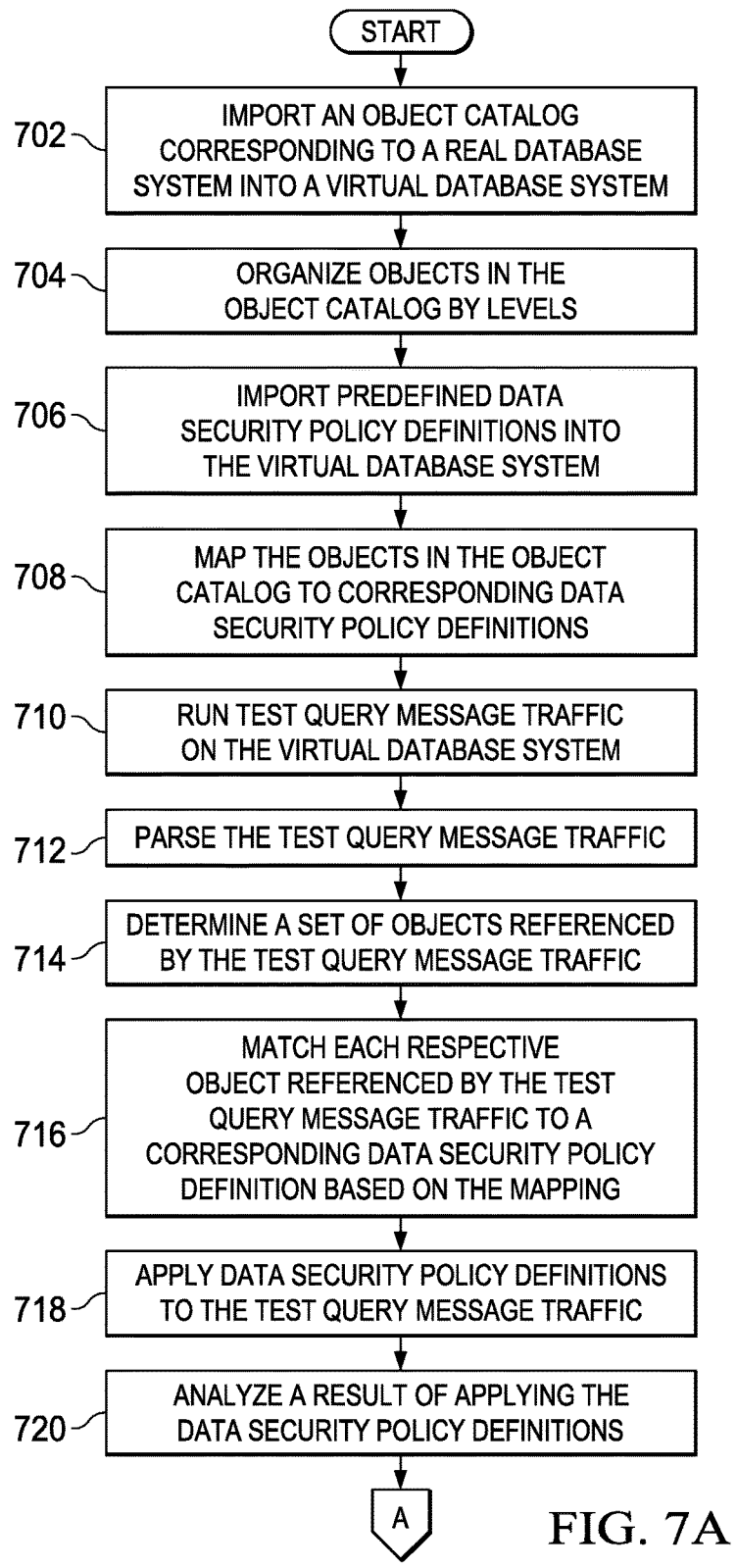
FIGS. 7A-7B are a flowchart illustrating a process for determining a data security risk level of a virtual database that corresponds to a real database in accordance with an illustrative embodiment.
Figure 7B:
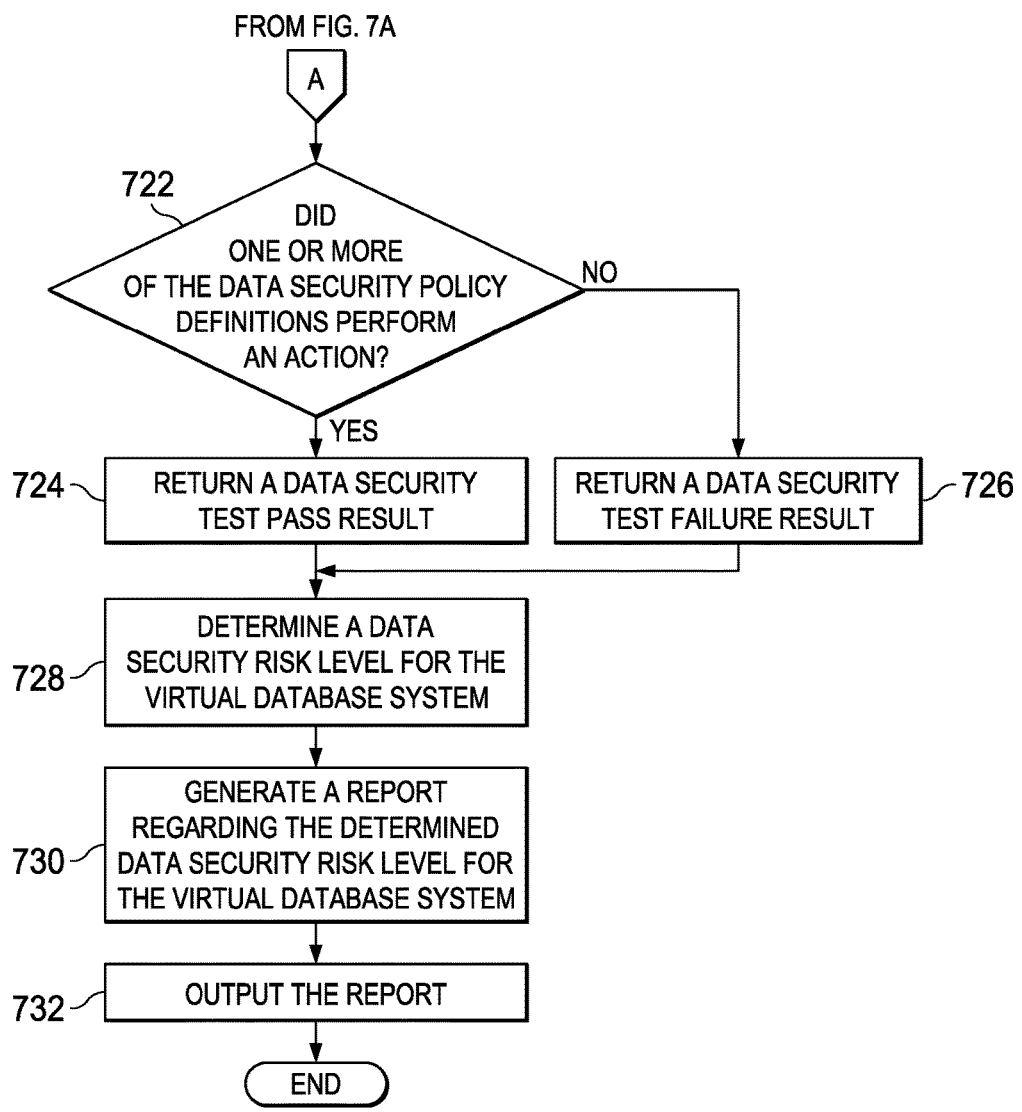

With reference now to FIGS. 7A-7B, a flowchart illustrating a process for determining a data security risk level of a virtual database that corresponds to a real database is shown in accordance with an illustrative embodiment. The process shown in FIGS. 7A-7B may be implemented in a computer, such as, for example, virtual database security testing server 104 in FIG. 1, data processing system 200 in FIG. 2, or virtual database security testing computer 302 in FIG. 3.

The process begins when the computer imports an object catalog corresponding to a real database system into a virtual database system (step 702). In addition, the computer organizes objects in the object catalog by levels within the virtual database system (step 704). Further, the computer imports predefined data security policy definitions into the virtual database system (step 706). Furthermore, the computer maps the objects in the object catalog to corresponding data security policy definitions (step 708).

Subsequently, the computer runs test query message traffic on the virtual database system (step 710). The computer parses the test query message traffic to identify a context and type of the test query message traffic (step 712). The computer also determines a set of objects referenced by the test query message traffic in the database catalog based on the identified context and type of the test query message traffic (step 714).

Afterward, the computer matches each respective object in the set of objects referenced by the test query message traffic to a corresponding data security policy definition based on the mapping (step 716). In addition, the computer applies data security policy definitions corresponding to the set of objects referenced by the test query message traffic to the test query message traffic (step 718). Further, the computer analyzes a result of applying the data security policy definitions corresponding to the set of objects referenced by the test query message traffic (step 720).

Subsequently, the computer makes a determination as to whether one or more of the data security policy definitions corresponding to the set of objects referenced by the test query message traffic performed an action in response to determining that one or more test query messages in the traffic did not satisfy respective parameters of the one or more data security policy definitions (step 722). If the computer determined that one or more of the data security policy definitions corresponding to the set of objects referenced by the test query message traffic did perform the action in response to determining that one or more test query messages in the traffic did not satisfy respective parameters of the one or more data security policy definitions, yes output of step 722, then the computer returns a data security test pass result (step 724). If the computer determined that one or more of the data security policy definitions corresponding to the set of objects referenced by the test query message traffic did not perform the action in response to determining that one or more test query messages in the traffic did not satisfy respective parameters of the one or more data security policy definitions, no output of step 722, then the computer returns a data security test failure result (step 726).

Moreover, the computer determines a data security risk level for the virtual database system based on returned test result (step 728). The computer also generates a report that includes statistical analysis, data risk defense ability analysis, performance analysis, and error analysis regarding the determined data security risk level for the virtual database system (step 730). In addition, the computer outputs the report (step 732). Thereafter, the process terminates.

Thus, illustrative embodiments of the present invention provide a computer-implemented method, computer system, and computer program product for generating a virtual database object catalog utilizing a corresponding real database object catalog, associating each of the objects within the virtual database object catalog with corresponding predefined data security policies for assessing a level of risk to virtual database objects that are referenced by incoming virtual database test query message traffic, and generating a data security violation report for the virtual database. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a data security risk level of a virtual database, the computer-implemented method comprising:

importing, by a computer, an object catalog corresponding to a real database into the virtual database;

organizing, by the computer, objects in the object catalog by levels within the virtual database;

determining, by the computer, whether one or more data security policy definitions corresponding to a set of objects referenced by test query message traffic performed an action in response to the computer determining that one or more test query messages in the test query message traffic run on the virtual database did not satisfy respective parameters of the one or more data security policy definitions;

responsive to the computer determining that one or more of the data security policy definitions corresponding to the set of objects referenced by the test query message traffic did not perform the action in response to determining that one or more test query messages in the traffic run on the virtual database did not satisfy respective parameters of the one or more data security policy definitions, returning, by the computer, a data security test failure result; and determining, by the computer, a data security risk level for the virtual database based on the returned data security test result.

2. The computer-implemented method of claim 1 further comprising:

responsive to the computer determining that one or more of the data security policy definitions corresponding to the set of objects referenced by the test query message traffic did perform the action in response to determining that one or more test query messages in the traffic run on the virtual database did not satisfy respective parameters of the one or more data security policy definitions, returning, by the computer, a data security test pass result.

3. The computer-implemented method of claim 1 further comprising:

generating, by the computer, a report that includes statistical analysis, data risk defense ability analysis, performance analysis, and error analysis regarding the determined data security risk level for the virtual database; and outputting, by the computer, the report.

4. The computer-implemented method of claim 1 further comprising:

importing, by the computer, predefined data security policy definitions into the virtual database; and mapping, by the computer, the objects in the object catalog to corresponding data security policy definitions in the predefined data security policy definitions.

5. The computer-implemented method of claim 1 further comprising:

parsing, by the computer, the test query message traffic to identify a context and a type of messages in the test query message traffic; and determining, by the computer, the set of objects referenced by the test query message traffic in the database catalog based on the context and the type of the messages in the test query message traffic.

6. The computer-implemented method of claim 1 further comprising:

matching, by the computer, respective objects in the set of objects referenced by the test query message traffic to a corresponding data security policy definition based on mapping objects in an object catalog of the virtual database to corresponding data security policy definitions; and applying, by the computer, data security policy definitions corresponding to the set of objects referenced by the test query message traffic to the test query message traffic.

7. The computer-implemented method of claim 6 further comprising:

analyzing, by the computer, a result of applying the data security policy definitions corresponding to the set of objects referenced by the test query message traffic using natural language processing.

\* \* \* \* \*